United States Patent
Koseki et al.

(10) Patent No.: US 11,275,511 B2
(45) Date of Patent: Mar. 15, 2022

(54) STORAGE APPARATUS AND DATA PROCESSING METHOD FOR STORAGE APPARATUS

(71) Applicant: HITACHI, LTD., Tokyo (JP)

(72) Inventors: Hideyuki Koseki, Tokyo (JP); Tomohiro Kawaguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/011,215

(22) Filed: Sep. 3, 2020

(65) Prior Publication Data

US 2021/0247913 A1 Aug. 12, 2021

(30) Foreign Application Priority Data

Feb. 7, 2020 (JP) .............................. JP2020-020101

(51) Int. Cl.
*G06F 3/06* (2006.01)
(52) U.S. Cl.
CPC .......... *G06F 3/0616* (2013.01); *G06F 3/0626* (2013.01); *G06F 3/0647* (2013.01); *G06F 3/0653* (2013.01); *G06F 3/0659* (2013.01); *G06F 3/0679* (2013.01)
(58) Field of Classification Search
None
See application file for complete search history.

(56) References Cited

U.S. PATENT DOCUMENTS

| | | | | |
|---|---|---|---|---|
| 9,183,137 B2* | 11/2015 | Schmier | ................. | G06F 3/0616 |
| 9,652,160 B1* | 5/2017 | Piszczek | ................ | G06F 3/0647 |
| 2013/0205070 A1* | 8/2013 | Koseki | .................. | G06F 3/0608 |
| | | | | 711/103 |
| 2014/0281168 A1* | 9/2014 | Koseki | .................. | G06F 3/0689 |
| | | | | 711/103 |
| 2015/0178191 A1* | 6/2015 | Camp | ................. | G06F 12/0246 |
| | | | | 711/103 |
| 2020/0057563 A1 | 2/2020 | Chiba et al. | | |

FOREIGN PATENT DOCUMENTS

JP 2015-505078 A 2/2015
WO 2017/175285 A 10/2017

* cited by examiner

*Primary Examiner* — Michael Alsip
(74) *Attorney, Agent, or Firm* — Volpe Koenig

(57) ABSTRACT

The accuracy of predicting the remaining life of a non-volatile memory in which WA occurs is enhanced. A storage controller predicts the remaining lives of SSDs on the basis of the data storage rates of the respective SSDs. When the storage controller determines that a life expectation result on one SSD does not satisfy a target operation period while a life expectation result on another SSD satisfies the target operation period, the storage controller executes extent migration processing of migrating data in any data stored extent to an extent in which data has not been stored, thereby decreasing the data storage rate of the one SSD to extend the life of the one SSD.

10 Claims, 18 Drawing Sheets

FIG. 5

VIRTUAL VOLUME MANAGEMENT TABLE 200

| VIRTUAL VOLUME# 201 | VIRTUAL CAPACITY 203 | USED CAPACITY 204 | VIRTUAL EXTENT# 205 | PG# 206 | EXTENT# 207 |
|---|---|---|---|---|---|
| 0 | 100TB | 30TB | 1 | 1 | 100 |
|   |       |      | 2 | 3 | 3 |
|   |       |      | ... | ... | ... |
|   |       |      | N | N/A | N/A |

FIG. 6

EXTENT MANAGEMENT TABLE 300

| PG# 301 | Extent# 302 | RAID Level 303 | Drive# 304 | Start-LBA 305 | Size 306 | STATE 307 |
|---|---|---|---|---|---|---|
| 0 | 1 | 3D1P | 0 | 0 | 256kB | ALLOCATED |
| | | | 1 | 0 | 256kB | |
| | | | 2 | 0 | 256kB | |
| | | | 3 | 0 | 256kB | |
| | 2 | 3D1P | 0 | 256kB | 256kB | UNALLOCATED |
| | | | 1 | 256kB | 256kB | |
| | | | 2 | 256kB | 256kB | |
| | | | 3 | 256kB | 256kB | |
| ... | ... | ... | ... | ... | ... | ... |

FIG. 7

PG MANAGEMENT TABLE 400

| PG# 401 | Drive# 402 | PG CAPACITY 403 | STORED DATA AMOUNT 404 | DATA STORAGE RATE 405 |
|---|---|---|---|---|
| 0 | 0 | 20TB | 15TB | 75% |
|   | 1 |   |   |   |
|   | 2 |   |   |   |
|   | 3 |   |   |   |

FIG. 8

| Drive MANAGEMENT TABLE 500 | | | | | | |
|---|---|---|---|---|---|---|
| 501 | 502 | 503 | 504 | 505 | 506 | 507 |
| Drive# | Drive type | USE START DATE | TARGET OPERATION PERIOD | Drive size | DATA STORAGE RATE | REMAINING LIFE (%) |
| 0 | SSD | 2019.9.1 | 2024.8.31 | 16TB | 50% | 90% |

FIG. 10

Drive STATISTICAL INFORMATION MANAGEMENT TABLE 700

| Drive# 701 | Time Stamp 702 | STORED DATA AMOUNT 703 | DATA STORAGE RATE 704 | DATA INCREASE RATE 705 | REMAINING LIFE (%) 706 | LIFE CONSUMPTION RATE 707 |
|---|---|---|---|---|---|---|
| 0 | T1 | 0.1TB | 0.6% | 30GB / day | 100% | 0.1% / day |
| | T2 | 1.0TB | 6.2% | 50GB / day | 99.8% | 0.1% / day |
| | ... | ... | ... | ... | ... | ... |
| | Tn | 3.0TB | 18.7% | N GB / day | N % | N % / day |
| | N/A | N/A | N/A | N/A | N/A | N/A |
| | N/A | N/A | N/A | N/A | N/A | N/A |
| | ... | ... | ... | ... | ... | ... |

FIG.11

SSD REMAINING LIFE PREDICTION TABLE 800

| DATA STORAGE RATE 801 | TYPE 802 | LIFE CONSUMPTION RATE 803 | ESTIMATED WA VALUE 804 | EXPECTED LENGTH OF STAY 805 | EXPECTED LIFE CONSUMPTION AMOUNT 806 | EXPECTED REMAINING LIFE 807 |
|---|---|---|---|---|---|---|
| 30% | Actual | 0.1% / day | 1.1 | | | 90.0 % |
| 30-40% | Expect | | 1.2 | 30 day | 3.2 % | 86.8 % | ← 8001
| 40-50% | Expect | | 1.5 | 30 day | 4.0 % | 82.8 % | ← 8002
| ... | Expect | | ... | 30 day | ... | ... | ← 8003
| 90-100% | Expect | | ... | | ... | ... |

STORAGE APPARATUS AND DATA PROCESSING METHOD FOR STORAGE APPARATUS

BACKGROUND OF THE INVENTION

1. Field of the Invention

The present invention relates to a storage apparatus and a data processing method for the storage apparatus.

2. Description of the Related Art

In recent years, as a memory device that is mounted on a storage apparatus, in addition to or in place of a hard disk drive (HDD), a non-volatile memory device (for example, solid state drive: SSD) including non-volatile memories (for example, flash memories: FMs) has been used.

An SSD generally has mounted thereon NAND FMs, typically, a plurality of FM chips and a memory controller configured to control the FM chips. The memory controller manages detailed control inside the SSD, for example, adjustment of used capacities of the FMs. Since FM chips can be erased a limited number of times due to their configuration, the FM chips have upper limit values (that is, life limits) of the total amount of writable data (the total amount of data to be written). Thus, SSDs having FM chips mounted thereon also have life limits.

JP-T-2015-505078 discloses an "SSD life prediction method" in which a storage controller configured to control an entire storage apparatus obtains, on the basis of life information acquired from each SSD, a life consumption rate that is a slope of a life consumption amount in a certain period and uses a linear approximation to the slope, thereby to predict a remaining period until the life of the corresponding SSD ends, and a "life extension method" that adjusts a write load between the SSDs (the amount of data to be written to the SSDs), thereby to extend the SSD lives.

SUMMARY OF THE INVENTION

Since FM chips are write-once, read-many devices, the FM chips cannot support data overwriting in principle. Accordingly, storing new data in an FM chip requires reclamation processing of erasing one or more blocks to generate available blocks again. The reclamation processing is not performed by a storage controller configured to control an entire storage apparatus, but is performed by a memory controller mounted on each SSD. When blocks are erased in the reclamation processing, it is necessary to migrate valid data in the blocks to be erased to other blocks. Thus, inside an SSD, there occurs a phenomenon called write amplification (hereinafter sometimes referred to as "WA") where the amount of data to be actually written in an FM is larger than the amount of data written from a higher-level apparatus. The remaining life of an SSD depends on the amount of writing, and hence, when WA occurs, the remaining life consumption rate increases.

When performing the reclamation processing, an SSD is to migrate valid data in blocks to be erased to other blocks. Thus, the SSD requires one or more spare blocks. The total capacity of all spare blocks is referred to as "spare capacity." Since an SSD requires a spare capacity in this way, a capacity that a user can use for data storage (referred to as "user capacity") is a capacity obtained by subtracting the spare capacity from the physical capacity of the SSD (the total capacity of all the blocks of the SSD). Note that, the ratio of a spare capacity to a user capacity in an SSD is referred to as "over-provisioning ratio (OP ratio)."

The OP ratio of an SSD affects the SSD life. For example, in an SSD having a large OP ratio, since a spare capacity is large, data migration is performed a small number of times in the reclamation processing, so that the amount of life consumption due to the data migration is small (WA is small). Meanwhile, in an SSD having a small OP ratio, since a spare capacity is small, data migration is performed a large number of times in the reclamation processing, so that the amount of life consumption due to the data migration is large (WA is large). In this way, the magnitude of WA depends on an over-provisioning ratio (OP ratio).

Here, the user capacity of an SSD can be divided into a "data stored area" in which user data has already been stored and a "data non-stored area" in which user data has not been stored yet. The SSD can use, when performing the reclamation processing, also the capacity of the data non-stored area as part of a spare capacity. Thus, a substantial OP ratio is the ratio of the sum of data non-stored user capacity and spare capacity to a data stored user capacity. As a result, WA changes depending on the amount of stored user data (that is, a data storage rate).

In general, the amount of user data stored in a storage apparatus (that is, SSD) increases over time. It is expected that, along with this, inside the SSD, WA increases due to a decrease in substantial OP ratio. Thus, with the related-art life prediction method using a linear approximation, which does not take the effect of an increase in WA in an SSD over time into consideration, a predicted SSD remaining life is longer than an actual SSD remaining life.

The present invention has been made in view of the above-mentioned circumstances and has an object to provide a storage apparatus and a data processing method for the storage apparatus that are capable of enhancing the accuracy of predicting the remaining life of a non-volatile memory in which WA occurs.

In order to achieve the above-mentioned object, according to a first aspect, there is provided a storage apparatus including a plurality of drives each including a plurality of non-volatile memories, and a controller configured to process data that is stored in the drives. The non-volatile memories each have a life based on an amount of data writing. The controller performs the processing based on a remaining life of each of the non-volatile memories and predicts the life of each of the non-volatile memories based on an amount of data writing to the corresponding drive and a data storage rate of the corresponding drive.

According to the present invention, it is possible to enhance the accuracy of predicting the remaining life of a non-volatile memory in which WA occurs.

BRIEF DESCRIPTION OF THE DRAWINGS

FIG. 5 is a diagram illustrating an exemplary virtual volume management table that is used in the storage apparatus of FIG. 4;

FIG. 6 is a diagram illustrating an exemplary extent management table that is used in the storage apparatus of FIG. 4;

FIG. 7 is a diagram illustrating an exemplary PG management table that is used in the storage apparatus of FIG. 4;

FIG. 8 is a diagram illustrating an exemplary Drive management table that is used in the storage apparatus of FIG. 4;

FIG. 10 is a diagram illustrating an exemplary Drive statistical information management table that is used in the storage apparatus of FIG. 4;

FIG. 11 is a diagram illustrating an exemplary SSD remaining life prediction table that is used in the storage apparatus of FIG. 4;

DESCRIPTION OF THE PREFERRED EMBODIMENTS

Embodiments are described with reference to the drawings. Note that, the following embodiments are not intended to limit the invention according to the scope of claims, and not all components and combinations thereof described in the embodiments are essential to solving means of the invention.

Figure 1:
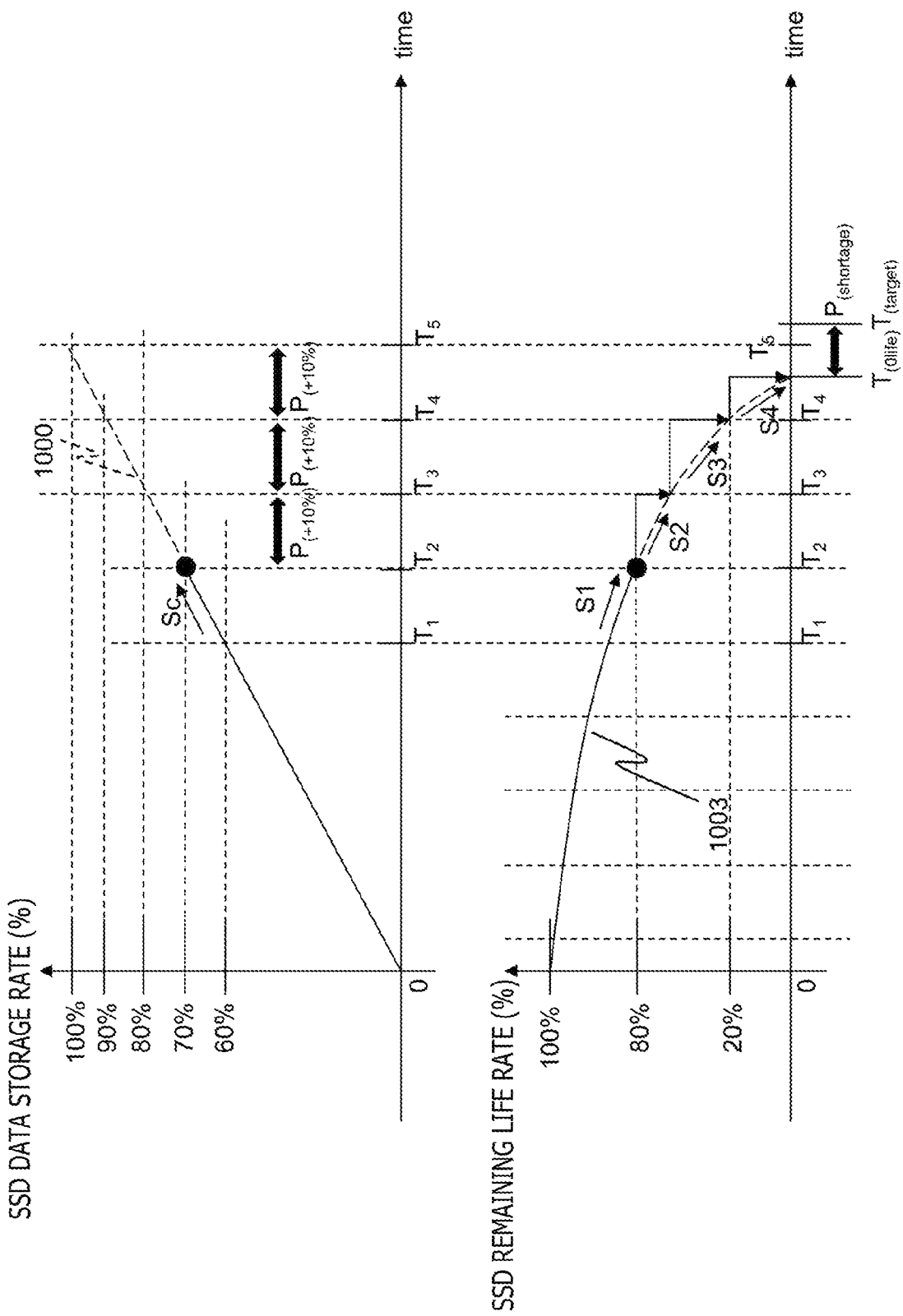
FIG. 1 is a diagram illustrating a relation between SSD data storage rate and SSD remaining life rate of a storage apparatus according to a first embodiment.

FIG. 1 is a diagram illustrating a relation between SSD data storage rate and SSD remaining life rate of a storage apparatus according to a first embodiment. In FIG. 1, the horizontal axis indicates the time. The vertical axis of the upper figure indicates the SSD data storage rate, and the vertical axis of the lower figure indicates the SSD remaining life rate.

In FIG. 1, the data storage rate is the ratio of stored data to logical block addressing (LBA) space provided by each SSD. For example, a state in which an SSD having a user capacity of 100 GB (an LBA space of 100 GB) has stored therein data taking 60 GB of the LBA space is defined as a data storage rate of 60%. Here, an expression "data storage rate=(stored data amount)/(user capacity)" can be given.

Meanwhile, the SSD remaining life rate indicates a general numerical value that is data that can be taken from the SSD with the use of a standard interface such as Self-Monitoring Analysis and Reporting Technology (SMART). In the present embodiment, it is assumed that the numerical value of the SSD remaining life rate decreases from 100% to 0%. Note that, a state in which the remaining life rate is 0% is defined as a state in which the SSD dies (reaches an upper limit of the total amount of writable data).

Next, a general relation between the transitions of SSD data storage rate and SSD remaining life is described. As described above, the WA of an SSD changes depending on a substantial OP ratio, and as the substantial OP ratio decreases, the WA increases. Note that, the substantial OP ratio means the ratio of a value obtained by adding a size of a user capacity in which data has not been stored to a spare capacity size to a size of a user capacity in which data has been stored.

Thus, even when the SSD data storage rate increases linearly as indicated by a graph 1000, WA increases gradually. Consequently, the SSD life consumption rate increases, with the result that the SSD remaining life rate does not decrease linearly as indicated by a graph 1003.

Here, as understood from the graphs 1000 and 1003, the decrease rate of the SSD remaining life rate depends on the data storage rate. Thus, an SSD storage controller predicts, on the basis of the SSD data storage rate, the remaining life of each SSD with WA reflected therein.

Here, in the graphs 1000 and 1003, when the current time is $T_2$, a solid line before time $T_2$ means a past transition and a broken line after time $T_2$ means a future transition predicted by the storage controller.

A slope Sc of the graph 1000 of the upper figure indicates an increase rate of a recent data storage rate (for example, a data increase amount per day (GB/Day)). The storage controller expects a future transition of the data storage rate on the basis of the slope Sc. For example, in a case where the data storage rate at time $T_2$ is 70% and prediction time $T_3$ at which the data storage rate has increased by 10% and is 80% is calculated, the storage controller obtains a period $P_{(+10\%)}$ required for the data storage rate to increase by 10% and adds the period to current time $T_2$, thereby obtaining prediction time $T_3$.

Specifically, the period $P_{(+10\%)}$ can be obtained by an expression "10% of SSD capacity (GB)/data storage rate increase rate Sc (GB/Day)." In a similar manner, prediction time $T_4$ at which the data storage rate is 90% and prediction time $T_5$ at which the data storage rate is 100% can be obtained by an expression "$T_3+P_{(+10\%)}$" and an expression "$T_4+P_{(+10\%)}$," respectively.

A slope S1 of the graph 1003 of the lower figure indicates a recent SSD life consumption rate (for example, a decrease amount of a life rate per day (%/Day)). In the following description, the slope S1 indicates a life consumption rate (actual value) in a section in which the data storage rate changes from 60% to 70%. A slope S2 indicates an expected value of the life consumption rate in a section in which the data storage rate changes from 70% to 80%. A slope S3 indicates an expected value of the life consumption rate in a section in which the data storage rate changes from 80% to 90%. A slope S4 indicates an expected value of the life consumption rate in a section in which the data storage rate changes from 90% to 100%. Note that, since a life consumption rate S is proportional to the magnitude of WA as described above, as the data storage rate increases, the value of the life consumption rate S increases, and a relation of S1<S2<S3<S4 is qualitatively established.

Next, a method that the storage controller uses to predict the slopes S2, S3, and S4 is described. The slope S1 indicates the life consumption rate in a period in which the data storage rate changes from 60% to 70% (that is, a period of from time $T_1$ to time $T_2$). The slopes S2, S3, and S4 are obtained by correcting the slope S1 with the ratio of WA. The storage controller has stored therein expected WA values at the respective data storage rates in advance. The storage controller multiplies, to the slope S1, a ratio calculated with the expected WA value (referred to as "WA correction value"), thereby to obtain the slope S2. For example, when the expected WA value at the data storage rate of from 60% to 70% is 2.5 and the expected WA value at the data storage rate of from 70% to 80% is 2.8, the predicted value of the slope S2 can be obtained by "slope S1×WA correction value (2.8/2.5)."

Thus, the predicted amount of life consumption from time $T_2$ to time $T_3$, by which it is expected that the data storage rate increases by 10%, can be calculated by "slope S1×WA correction value (2.8/2.5)×expected period $P_{(+10\%)}$." By repeating similar calculation until each data storage rate reaches 100%, a storage controller 10 can predict time $T_{(Olife)}$ at which the lives of the SSDs end.

However, $T_{(Olife)}$ is not always necessarily a multiple of $P_{(+10\%)}$. In FIG. 1, $T_{(Olife)}$ is before $T_5$ (=$T_4$+$P_{(+10\%)}$). In the case where a remaining life after $P_{(+10\%)}$ falls below zero in this way, a required period from time $T_4$ to $T_{(Olife)}$ may be obtained by "expected remaining life rate at time $T_4$/slope S4."

Here, time $T_{(Olife)}$ means an expected time at which the life of an SSD ends, and time $T_{(target)}$ means a day until which the SSDs are intended to operate (for example, a date five years from operation start). In FIG. 1, since $T_{(Olife)}$ is before $T_{(target)}$, the SSD life expectation result indicates that the target operation period is not achieved. Note that, $P_{(shortage)}$ (Day) is a difference between $T_{(target)}$ and $T_{(Olife)}$ and indicates an expected number of days of life shortage.

Figure 2:
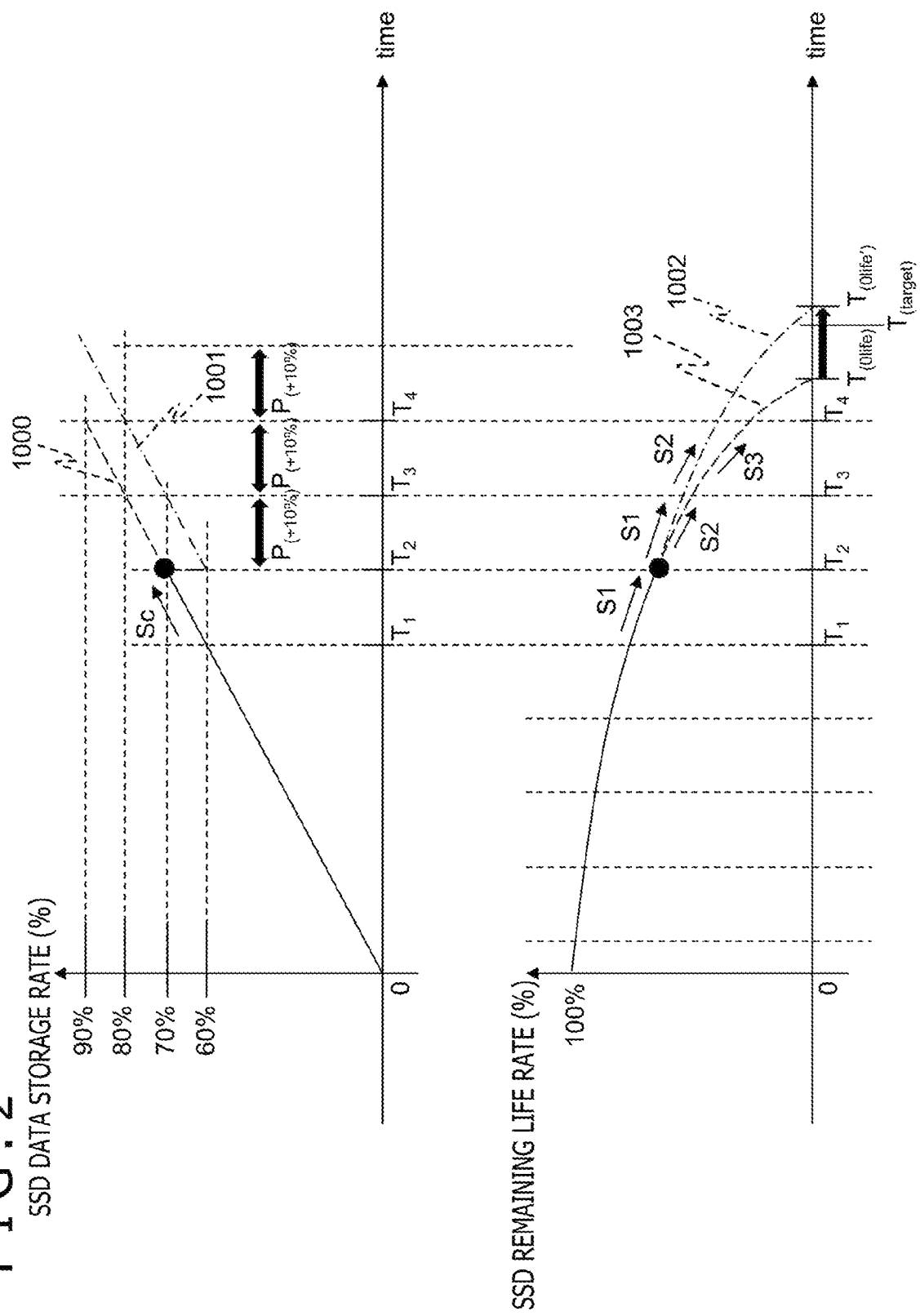
FIG. 2 is a diagram illustrating an SSD remaining life rate extension method with SSD data storage rate adjustment in the storage apparatus according to the first embodiment.

FIG. 2 is a diagram illustrating an SSD remaining life rate extension method with SSD data storage rate adjustment in the storage apparatus according to the first embodiment. FIG. 2 illustrates changes in data storage rate and remaining life rate with and without data migration. Now, a way of thinking of life extension by the storage controller in a case where it is determined that the life of an SSD ends at time $T_2$ is described.

In FIG. 2, the storage controller performs life prediction with increase and decrease in WA due to increase and decrease in SSD data storage rate reflected therein and adjusts the data storage rate of an SSD whose life does not last for the target operation period, thereby to extend the life of the SSD.

Specifically, the storage controller obtains the number of days of life shortage $P_{(shortage)}$ as a result of the life prediction described with FIG. 1. The storage controller migrates the amount of data obtained by dividing $P_{(shortage)}$ by the data storage rate increase rate Sc from the SSD to another SSD (that is, decreases the data storage rate of the SSD having the insufficient life), thereby to extend the life of the SSD. Specifically, for example, since $P_{(shortage)}$ is smaller than $P_{(+10\%)}$, the storage controller determines to migrate 10% of the data in the SSD so that a life expectation result on the SSD satisfies the target operation period. Specifically, as the amount of data to be migrated to another SSD, the storage controller determines, for example, when $P_{(shortage)}/P_{(+10\%)}$ is 0.8, the amount of data corresponding to one $P_{(+10\%)}$ that corresponds to the rounded up value, that is, data corresponding to a data storage rate of 10%.

In FIG. 2, the graph 1000 indicates a data storage rate expectation result without data migration, and the graph 1003 indicates a remaining life rate expectation result without data migration. Meanwhile, a graph 1001 indicates a data storage rate expectation result with data migration, and a graph 1002 indicates a remaining life rate expectation result with data migration.

At time $T_2$, the storage controller migrates 10% of the data from the SSD to another SSD. Thus, as indicated by the graph 1001, the SSD data storage rate changes from 70% to 60%. After that, with expectation that the data amount increases at the current data storage rate increase rate Sc, the storage controller expects that the SSD data storage rate transitions to 70% at time $T_3$, and to 80% at time $T_4$.

By virtue of the migration of 10% of the data in the SSD (a decrease in data storage rate), a substantial OP ratio is improved, and the life decrease rate after $T_2$ thus decreases. Specifically, as indicated by the graphs 1002 and 1003, the slope from time $T_2$ to time $T_3$ changes from the slope S2 corresponding to the storage rate of from 70% to 80% in the case without data migration to the slope S1 corresponding to the storage rate of from 60% to 70% in the case with data migration, and the life decrease rate is eased. In a similar manner, the slope from time $T_3$ to time $T_4$ changes from the slope S3 to the slope S2. As a result, time at which the life of the SSD ends is pushed back from time $T_{(Olife)}$ to time $T_{(Olife')}$, and can thus exceed time $T_{(target)}$ that is the target operation date.

Figure 3:
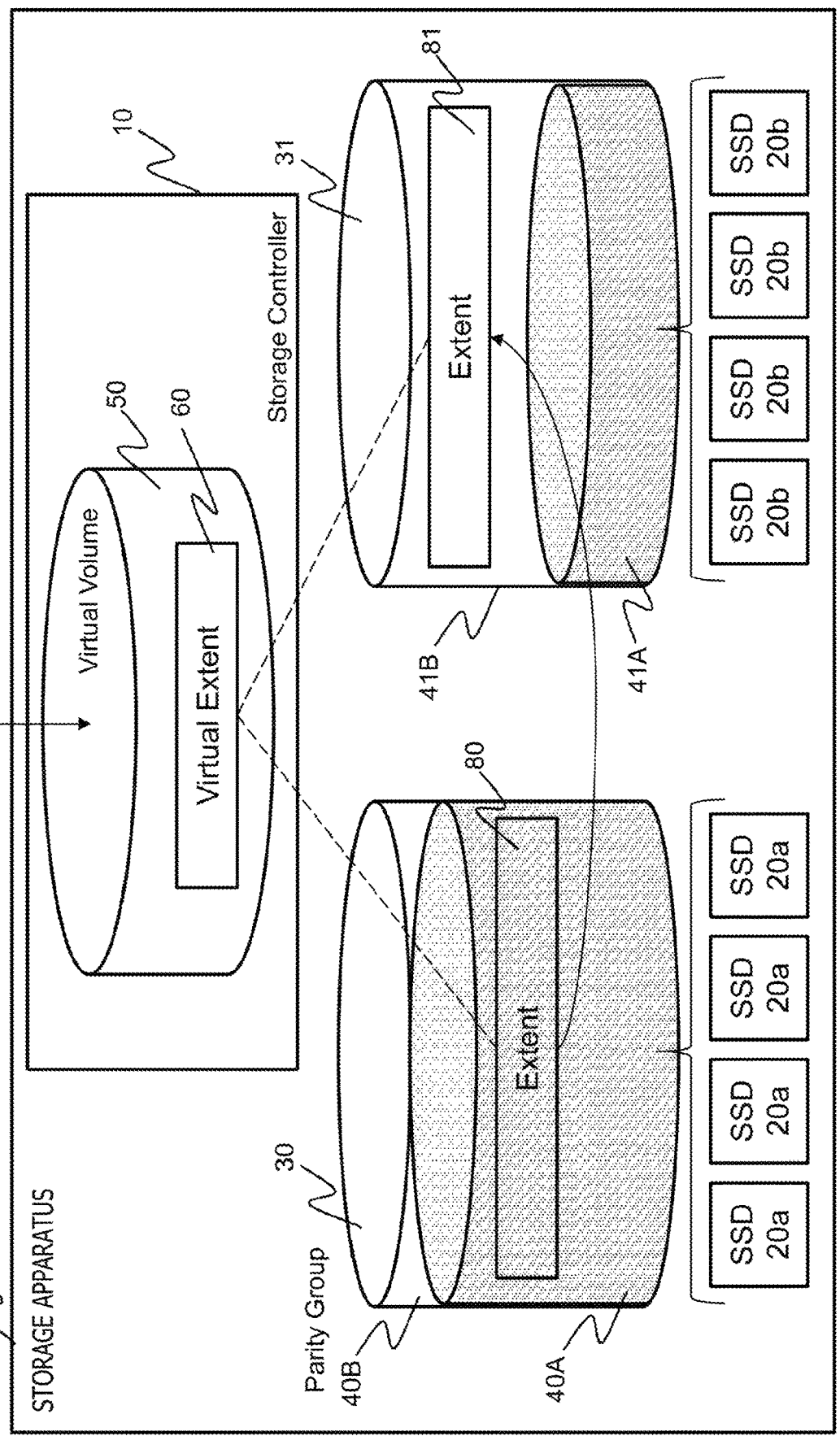
FIG. 3 is a block diagram illustrating an SSD life extension method in the storage apparatus according to the first embodiment.

FIG. 3 is a block diagram illustrating an SSD life extension method in the storage apparatus according to the first embodiment.

In FIG. 3, a storage apparatus 1 includes a plurality of SSDs 20a and 20b, which are memory devices, and the storage controller 10 configured to control the memory devices. The SSDs 20a and 20b each include non-volatile memories (for example, NAND flash memories). The storage apparatus 1 is connected to a host apparatus 2.

The storage controller 10 forms a parity group 30 with the plurality of SSDs 20a, and forms a parity group 31 with the plurality of SSDs 20b. The storage controller 10 manages a memory area of each of the parity groups 30 and 31 divided into sections in a predetermined size. This section is referred to as "extent." Extents 80 and 81 each include data held by the corresponding SSDs 20a and 20b.

The storage apparatus 1 provides a virtual volume 50 to the host apparatus 2. The virtual volume 50 is formed by thin provisioning, for example. When receiving a write request to the virtual volume 50 from the host apparatus 2, the storage controller 10 allocates the extent 80 in the parity group 30 to a virtual extent 60 of the virtual volume 50, and writes data based on the write request to the extent 80. In the present embodiment, this state is referred to as a state in which the virtual extent 60 refers to the extent 80.

The parity groups 30 and 31 have respective data stored areas 40A and 41A (shaded parts) in which data has been stored, and respective data non-stored areas 40B and 41B (blank parts) in which data has not been stored. Here, any of the virtual extents 60 is referring to the extent 80 present in the data stored area 40A. In the extent 81 present in the data non-stored area 41B, data has not been stored.

The storage controller 10 predicts the remaining lives of the SSD 20a and SSD 20b on the basis of the data storage rates of the respective SSD 20a and SSD 20b. Further, it is assumed that the storage controller 10 has determined that a life expectation result on the SSD 20a does not satisfy the target operation period while a life expectation result on the SSD 20b satisfies the target operation period. Here, the storage controller 10 can select the SSD 20a as a life extension target SSD from which data is migrated and select the SSD 20b as an SSD to which the data is migrated. Then, the storage controller 10 executes extent migration processing of migrating data in any data stored extent 80 to the extent 81 in which data has not been stored. Here, the storage controller 10 switches the extent that the virtual extent 60 refers to from the extent 80 that is a migration source to the extent 81 that is a migration destination. With this extent migration processing, the storage controller 10 can decrease the data storage rate of the SSD 20a, thereby to extend the life of the SSD 20a.

Figure 4:
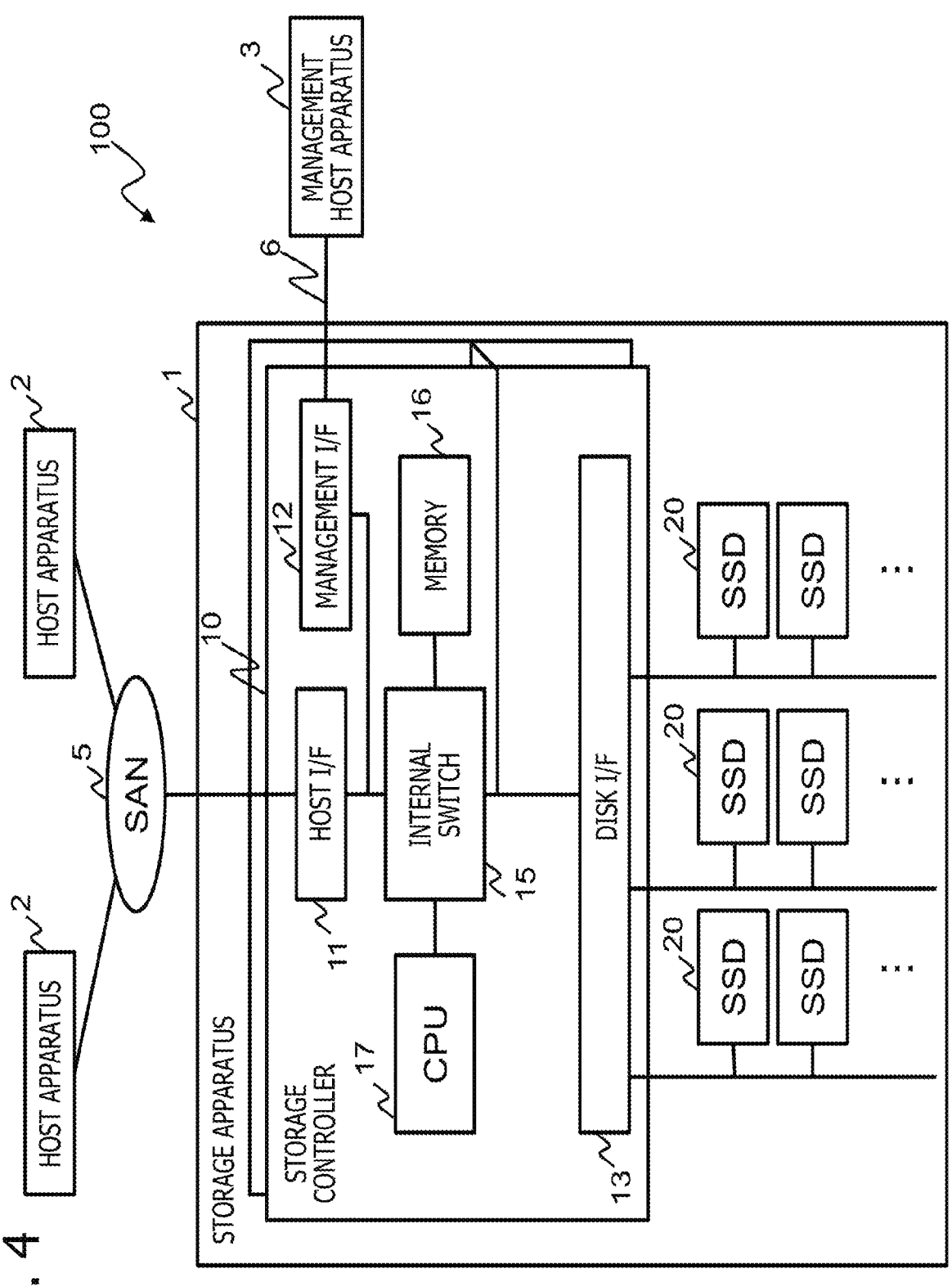
FIG. 4 is a block diagram illustrating a hardware configuration example of the storage apparatus according to the first embodiment.

FIG. 4 is a block diagram illustrating a hardware configuration example of the storage apparatus according to the first embodiment.

In FIG. 4, a computer system 100 includes the storage apparatus 1, the host apparatus 2, and a management host apparatus 3. The storage apparatus 1 and the host apparatus 2 are communicably connected to each other via a storage area network (SAN) 5. The storage apparatus 1 and the management host apparatus 3 are communicably connected to each other via a local area network (LAN) 6.

The storage apparatus 1 stores data using a Redundant Arrays of Inexpensive Disks (RAID) system. The host apparatus 2 is a higher-level apparatus configured to request the storage apparatus 1 to write or read data (user data). In the example of FIG. 4, the two host apparatuses 2 are illustrated, but one or three or more host apparatuses 2 may be provided, instead of two. The management host apparatus 3 is a management apparatus configured to manage the storage apparatus 1, and receives various notifications from the storage apparatus 1 and transmits various instructions to the storage apparatus 1.

The storage apparatus 1 includes the storage controller 10 and a plurality of SSDs 20. The storage controller 10 includes a host interface (I/F) 11, a management I/F 12, a disk I/F 13, an internal switch 15, a memory 16, and a central processing unit (CPU) 17.

The storage controller 10 is a control unit configured to control reading/writing of data from/to the SSDs 20. In the example of FIG. 4, the storage controller 10 is duplicated to create a replica of data to be read or written, thereby achieving a higher reliability, but the storage controller 10 may not be duplicated, or may be multiplexed triply or more.

The host I/F 11 communicates with the host apparatus 2. The management I/F 12 communicates with the management host apparatus 3. The disk I/F 13 communicates with the SSDs 20. The internal switch 15 switches the connections of the parts of the storage controller 10.

The memory 16 temporarily records data to be read/written from/to the SSDs 20. Further, the memory 16 records management information for managing the storage apparatus 1 and a program for defining the operation of the CPU 17. The CPU 17 is a computing machine (computer) configured to read the program recorded on the memory 16 and execute the read program, thereby to realize various functions.

The SSDs 20 are each a memory apparatus configured to store data and are also called "flash memory drive." The SSDs 20 form a parity group (PG) in which data is stored in a distributed manner. Although, in the example of FIG. 4, the all-flash array (AFA) only including the SSDs as the memory apparatuses is used, a hybrid array having a mixture of SSDs and HDDs may be used. Further, storage class memories (SCMs) may be used instead of SSDs or a mixture of SSDs and SCMs may be used.

FIG. 5 is a diagram illustrating an exemplary virtual volume management table that is used in the storage apparatus of FIG. 4. Note that, the tables illustrated in FIG. 5 to FIG. 11 are each managed by the storage controller 10.

In FIG. 5, a virtual volume management table 200 has entries of virtual volume #201 specifying the virtual volume 50 of FIG. 3, virtual capacity 203 indicating the virtual volume size, used capacity 204 indicating the amount of data stored in the virtual volume, virtual extent #205 specifying the virtual extent 60 in the virtual volume 50, and PG #206 and extent #207 specifying the extent 80 or 81 associated with the virtual extent #205. Note that, in a case where a virtual extent is associated with no actual extent, N/A is stored in the PG #206 and the extent #207.

FIG. 6 is a diagram illustrating an exemplary extent management table that is used in the storage apparatus of FIG. 4.

In FIG. 6, an extent management table 300 has entries of PG #301 specifying PGs to which extents belong, Extent #302 specifying the extents 80 and 81, RAID Level 303 indicating the RAID configurations of the extents, Drive #304 specifying the SSDs 20 belonging to the extent 80 or 81, Start-LBA 305 and Size 306 specifying the areas of the drives corresponding to the extents, and state #307 specifying whether or not the extents have data stored therein (are allocated to any virtual extent 60). In FIG. 6, for example, it is indicated that Extent #1 includes the area of an LBA of from 0 to 256 KB of each of Drives #1 to 3.

FIG. 7 is a diagram illustrating an exemplary PG management table that is used in the storage apparatus of FIG. 4.

In FIG. 7, a PG management table 400 has entries of PG #401 specifying a PG, Drive #402 specifying drives belonging to the PG, PG capacity 403 indicating the capacity of the PG, stored data amount 404 indicating the amount of data stored in the PG, and data storage rate 405 indicating the ratio of the amount of data stored in the PG.

FIG. 8 is a diagram illustrating an exemplary Drive management table that is used in the storage apparatus of FIG. 4. The storage controller 10 can only grasp, with regard to a state inside each drive, a used capacity, an empty capacity, the address of data that can been seen from outside the drive (this may be different from the address of data actually stored in the FM of the SSD 20), and the like. Thus, the storage controller 10 manages, using the Drive management table illustrated in FIG. 8, the remaining life and data storage rate of each drive.

In FIG. 8, a Drive management table 500 has entries of Drive #501 specifying a memory device, Drive type 502 specifying the type of the memory device such as an SSD or HDD, use start date 503 indicating a date on which the memory device has been used for the first time, target operation period 504 of the memory device, Drive size 505 indicating the capacity of the device, data storage rate 506 indicating a data storage rate, and remaining life 507 of the device. In a case where the target operation period of the device is five years, in the target operation period 504, a date five years from a date in the use start date 503 is stored. In the remaining life 507, in a case where the device type is an SSD, the numerical value of a remaining life rate acquired from the SSD is stored.

Figure 9:
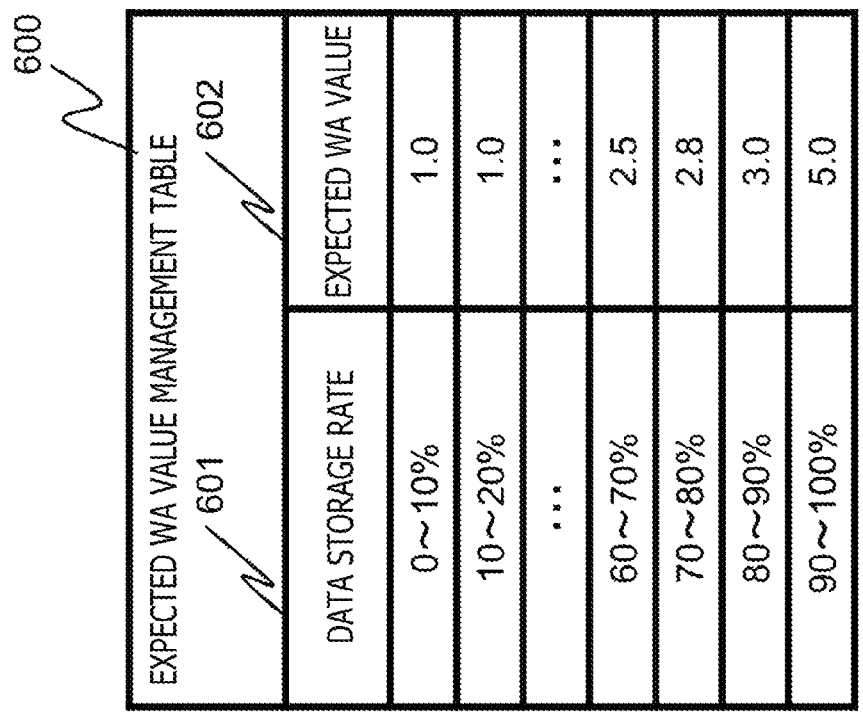
FIG. 9 is a diagram illustrating an exemplary expected WA value management table that is used in the storage apparatus of FIG. 4.

FIG. 9 is a diagram illustrating an exemplary expected WA value management table that is used in the storage apparatus of FIG. 4.

In FIG. 9, an expected WA value management table 600 has entries of SSD data storage rate 601 and expected WA value 602. For example, in the data storage rate 601 and the expected WA value 602, expected WA values when the storage rate changes with increments of 10% are stored. The expected WA value 602 may have numerical values obtained from theoretical values or measurement values obtained by prior evaluation in advance, for example.

FIG. 10 is a diagram illustrating an exemplary Drive statistical information management table that is used in the storage apparatus of FIG. 4.

In FIG. 10, a Drive statistical information management table 700 is used by the storage controller 10 to record the actual usage of each drive. The Drive statistical information management table 700 has entries of Drive #701 specifying a drive, Time Stamp 702 indicating times of statistical information acquisition, stored data amount 703 and data storage rate 704 at the acquisition, data increase rate 705 indicating the rate of increase and decrease of a data storage rate from the last acquisition to the current acquisition, SSD remaining life 706 indicating SSD remaining lives at the times of statistical information acquisition, and life consumption rate 707. For example, when Time Stamp of the current acquisition is $T_2$ and Time Stamp of the last acquisition is $T_1$, a data increase rate and a life decrease rate in the period of from $T_1$ to $T_2$ are stored in the data increase rate 705 and the life consumption rate 707.

FIG. 11 is an exemplary SSD remaining life prediction table that is used in the storage apparatus of FIG. 4.

In FIG. 11, an SSD remaining life prediction table 800 is used by the storage controller 10 to calculate an expected end-of-life time of the SSD 20. Although not illustrated, the storage controller 10 has the SSD remaining life prediction table 800 for each of the SSDs 20. The SSD remaining life prediction table 800 has entries of data storage rate 801, data type 802, life consumption rate 803, estimated WA value 804, expected length of stay 805, expected life consumption amount 806, and expected remaining life 807.

In the data storage rate 801, for example, numerical values are stored with increments of 10%. In the type 802, one of "Actual" representing actual values and "Expect" representing expected values is stored. The life consumption rate 803 indicates the latest life consumption rate, and, as the value thereof, the latest value of the life consumption rate 707 in the Drive statistical information management table 700 is stored. In the estimated WA value 804, expected WA values corresponding to the respective data storage rates are stored. For example, in a third line 8003 of the estimated WA value 804, an expected WA value when the data storage rate is from 40% to 50% is stored on the basis of the expected WA value management table 600. In the expected length of stay 805, an expected value of how long it takes for the data storage rate to increase by 10%, for example, is input. This value is equal to $P_{(+10\%)}$ that is the expected period that the data storage rate takes to increase by 10% as illustrated in FIG. 9. The expected life consumption amount 806 indicates expected life consumption amounts in the period. This calculation can use an expression "life consumption rate 803×ratio of estimated WA value 804×estimated length of stay 805." The expected remaining life 807 indicates predicted life rate values at the respective data storage rates.

In the present embodiment, in the table 800, the latest actual value is stored in the first line, and the predicted values are stored in the second and subsequent lines. A first line 8001 of the table indicates that the data storage rate of a prediction target SSD in life prediction is 30%, the life consumption rate is actually 0.1% per day, and the remaining life is 90%. A second line 8002 of the table 800 indicates that it is expected that, when the data storage rate increases from 30% by 10% to 40%, the expected WA value increases from 1.1 to 1.2, the expected value of how long it takes for the data storage rate to reach 40% is 30 days, and a life consumed in the 30 days is 3.2% (0.1%/day×1.2/1.1×30 day), with the result that the remaining life decreases from 90% to 86.8%.

Figure 12:
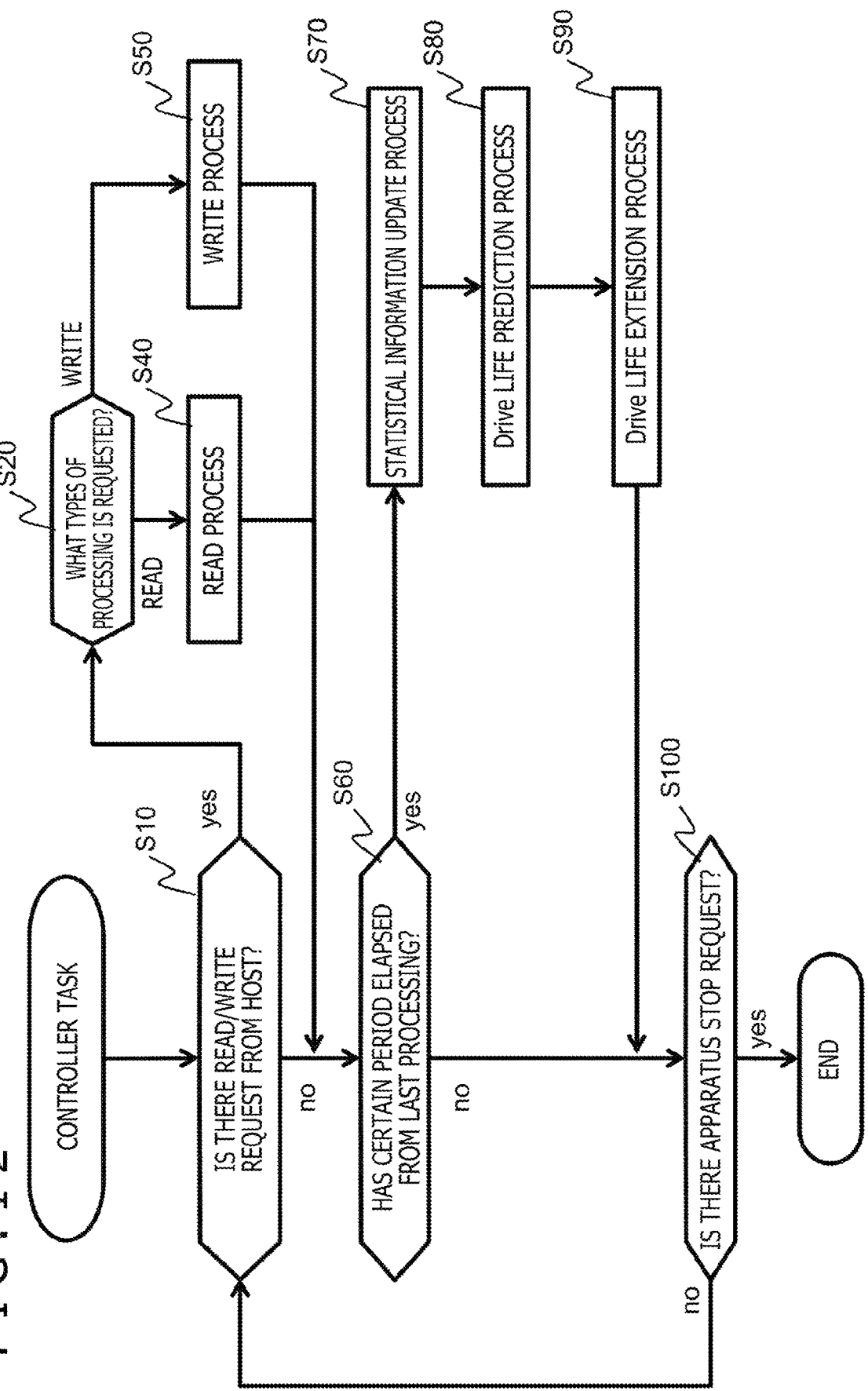
FIG. 12 is a flowchart illustrating exemplary operation of the storage apparatus of FIG. 4.

FIG. 12 is a flowchart illustrating exemplary operation of the storage apparatus of FIG. 4.

In FIG. 12, the storage controller 10 determines whether or not the host I/F 11 has received a read/write request from the host apparatus 2 (Step S10). In a case where a request has been received and the request is a read request (Step S20: read), the storage controller 10 performs a read process of reading data from the SSD 20 in response to the read request and transmitting the read data to the host apparatus 2 (Step S40). After that, the storage controller 10 proceeds to Step S60.

Meanwhile, in a case where the request is a write request, the storage controller 10 executes a write process of writing data to the SSD 20 in response to the write request (see FIG. 13) (Step S50). After that, the storage controller 10 proceeds to Step S60.

In a case where no request has been received in Step S10, the case where the processing in Step S40 ends, or the case where the processing in Step S50 ends, the storage controller 10 determines whether or not a certain period has elapsed from the last processing (Step S60).

In a case where it is determined in Step S60 that the certain period has elapsed, the storage controller 10 executes a process of updating statistical information on the SSD 20 (see FIG. 14) (Step 70). After that, the storage controller 10 executes a process of predicting the life of the SSD 20 (see FIG. 15) (Step 80), and an SSD life extension process (see FIG. 16) (Step S90). When Step 90 ends, the storage controller 10 proceeds to Step S100.

In a case where it is determined in Step S60 that the certain period has not elapsed or in the case where the processing in Step S90 ends, the storage controller 10 determines whether or not the management I/F 12 has received a stop request for stopping the storage apparatus 1 from the management host apparatus 3 (Step S100). In a case where no stop request has been received, the storage controller 10 returns to the processing in Step S10. In a case where a stop request has been received, the storage controller 10 ends the processing.

Figure 13:
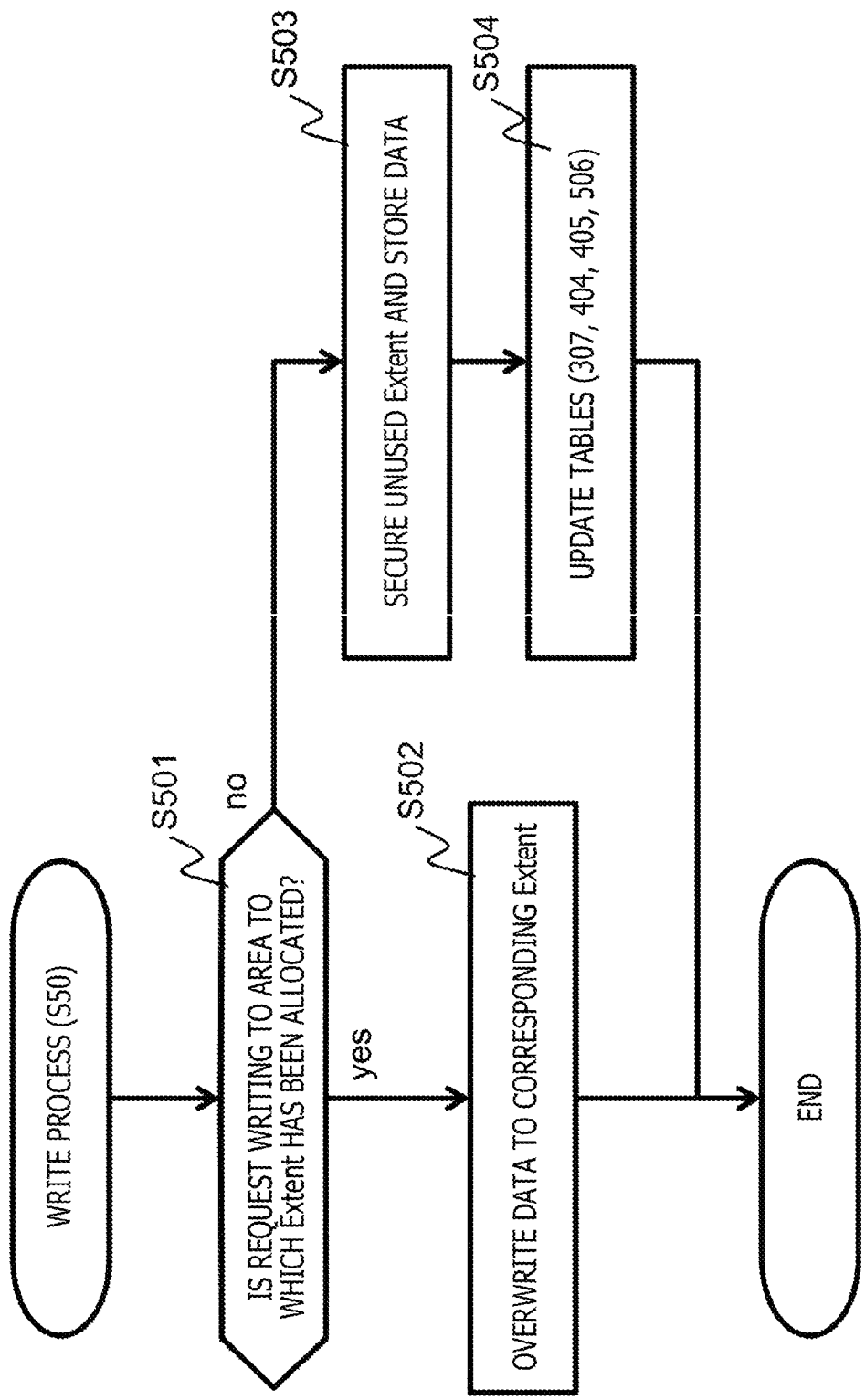
FIG. 13 is a flowchart illustrating an exemplary write process of the storage apparatus of FIG. 4.

FIG. 13 is a flowchart illustrating an exemplary write process of the storage apparatus of FIG. 4.

In FIG. 13, in the write process, the storage controller 10 refers to address information on a write request to determine whether the request is writing to an area to which an extent has been allocated (Step S501). In a case where it is determined in Step S501 that the extent has been allocated to the area, the storage controller 10 overwrites the data on the allocated extent (Step S502), and ends the series of processes.

Meanwhile, in a case where it is determined in Step S501 that the request is writing to an area to which an extent has not been allocated, the storage controller 10 secures an unallocated extent and stores the data (Step S503). After that, the storage controller 10 updates the state 307 in the extent management table 300 of FIG. 6, the stored data amount 404 and data storage rate 405 in the PG management table 400 of FIG. 7, and the data storage rate 506 in the Drive management table 500 of FIG. 8 (Step S504), and ends the series of processes.

Figure 14:
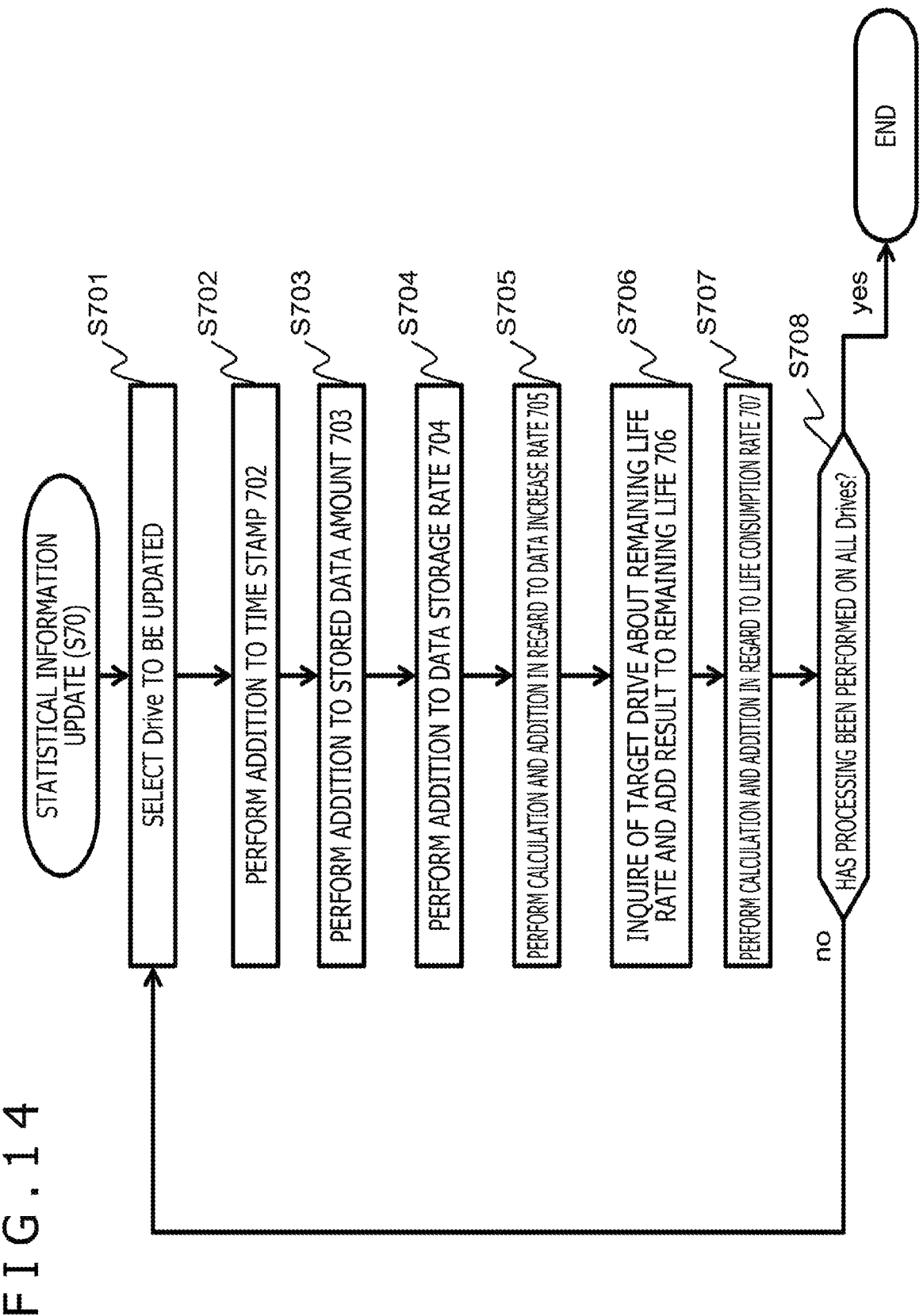
FIG. 14 is a flowchart illustrating an exemplary statistical information update process of the storage apparatus of FIG. 4.

FIG. 14 is a flowchart illustrating an exemplary statistical information update process of the storage apparatus of FIG. 4.

In FIG. 14, in the statistical information update process, the storage controller 10 selects a drive to be updated (Step S701).

Next, the storage controller 10 adds a current time to the Time Stamp 702 (Step S702), adds a current stored data amount to the stored data amount 703 (Step S703), and adds a current data storage rate to the data storage rate 704 (Step S704) in the Drive statistical information management table 700 of FIG. 10. Next, the storage controller 10 calculates a data increase rate from an elapsed time from the last timestamp acquisition and the amount of increase from the last stored data amount, and adds the result to the data increase rate 705 (Step S705).

Next, the storage controller 10 issues a command for inquiring of the target drive about its remaining life rate, and adds a received value to the remaining life 706 (Step S706). The storage controller 10 calculates a life consumption rate in the period on the basis of the thus obtained result, and adds the life consumption rate to the life consumption rate 707 (Step S707). When the processing in Step S707 ends, the storage controller 10 determines whether information on all the drives to be updated has been updated (Step S708). When the result of the determination in Step S708 is No, the storage controller 10 returns to the processing in Step S701 (Step S708: no). When the result of the determination in Step S708 is Yes, the storage controller 10 ends the series of processes (Step S708: yes).

Figure 15:
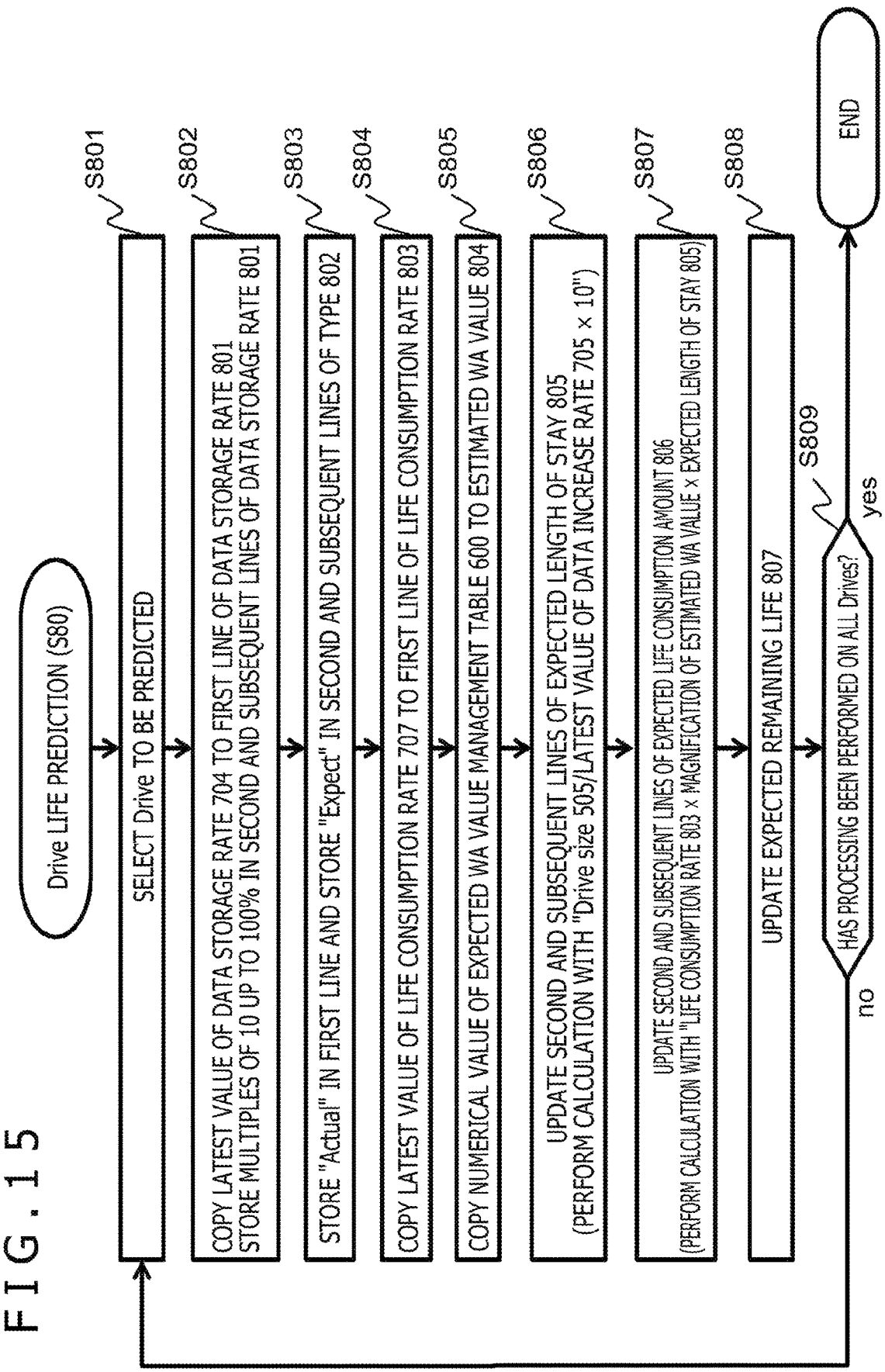
FIG. 15 is a flowchart illustrating an exemplary Drive life prediction process of the storage apparatus of FIG. 4.

FIG. 15 is a flowchart illustrating an exemplary Drive life prediction process of the storage apparatus of FIG. 4.

In FIG. 15, in the Drive life prediction process, the storage controller 10 selects a drive whose life is to be predicted (Step S801).

Next, in the SSD remaining life prediction table 800 of FIG. 11, the storage controller 10 copies the latest value of the data storage rate 704 to the first line of the data storage rate 801, and stores data storage rates up to 100% with increments of 10% in the second and subsequent lines of the data storage rate 801 (Step S802). Next, the storage controller 10 inputs "Actual" to the first line and inputs "Expect" to the second and subsequent lines of the type 802 (Step S803).

Next, the storage controller 10 copies the latest value of the life consumption rate 707 to the first line of the life consumption rate 803 (Step S804). Next, the storage controller 10 refers to the expected WA value management table 600 of FIG. 9 and copies the values of the expected WA value 602 corresponding to the respective data storage rates to the estimated WA value 804 (Step S805). Next, the storage controller 10 updates the second and subsequent lines of the expected length of stay 805. This calculation can use an expression "Drive size 505/latest value of data increase rate 705×10" (Step S806).

Next, the storage controller 10 updates the second and subsequent lines of the expected life consumption amount 806. This calculation can use an expression "life consumption rate 803× magnification of estimated WA value 804× expected length of stay 805" (Step S807). Next, the storage controller 10 updates the expected remaining life 807 (Step S808) and determines whether the lives of all the target drives have been predicted (Step S809).

In a case where not all the target drives have been predicted, the storage controller 10 returns to the processing in Step S801 (Step S809: no). Meanwhile, in a case where all the target drives have been predicted, the storage controller 10 ends the series of processes (Step S809: yes).

Figure 16:
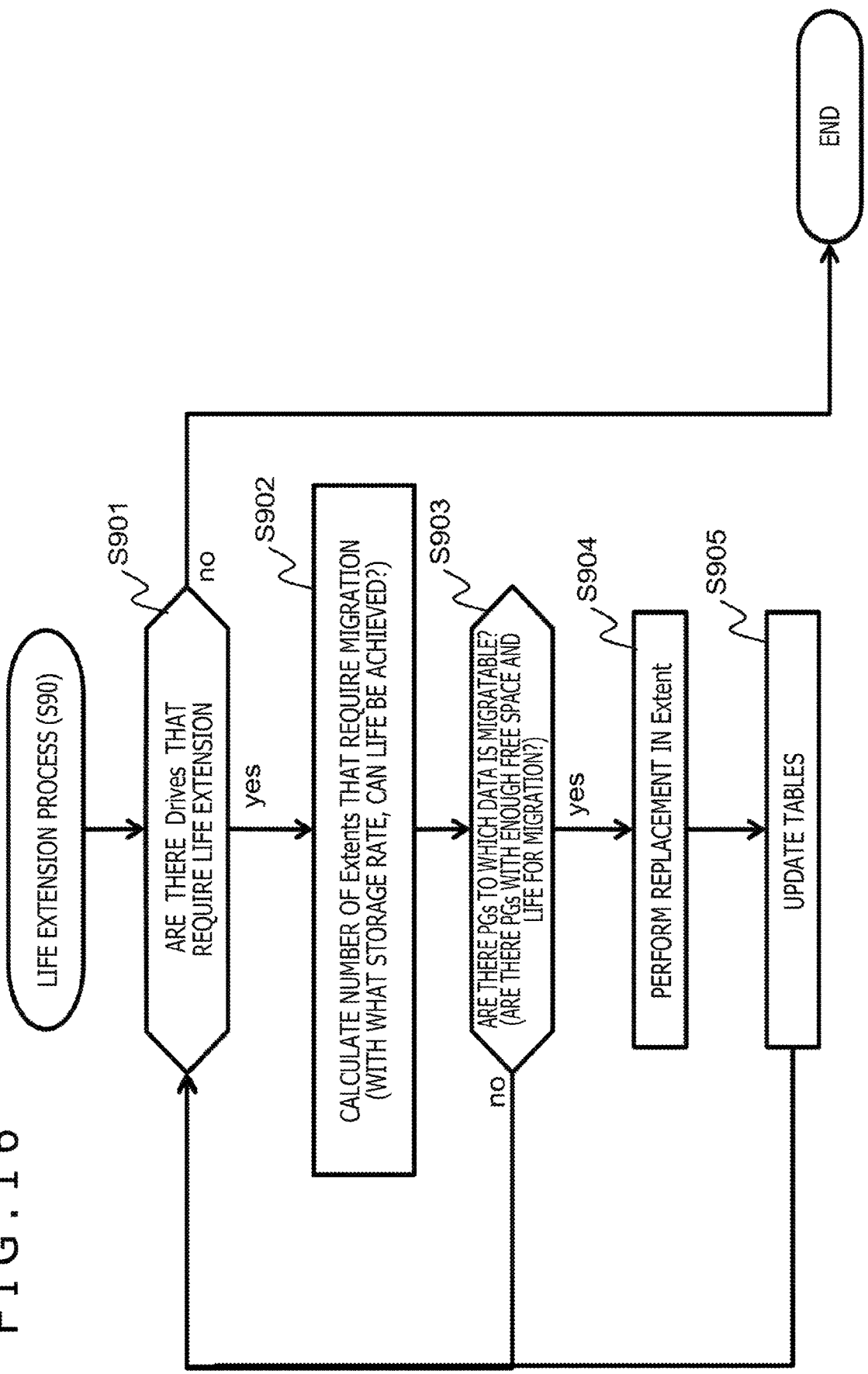
FIG. 16 is a flowchart illustrating an exemplary Drive life extension process of the storage apparatus of FIG. 4.

FIG. 16 is a flowchart illustrating an exemplary Drive life extension process of the storage apparatus of FIG. 4.

In FIG. 16, in the Drive life extension process, the storage controller 10 determines whether there are drives that require the life extension processing. Specifically, the storage controller 10 determines that a drive whose expected end-of-life date is before the target operation date requires the life extension processing (Step S901).

In a case where it is determined as a result of the processing in Step S901 that there is a drive that requires the life extension processing (Step S901: yes), the storage controller 10 calculates, using the method described with FIG. 2, the amount of to-be-migrated data necessary for allowing the drive to operate for the target period (Step S902).

Next, the storage controller 10 determines, with respect to the result of the calculation in S902, whether there are parity groups to which data is migratable. Specifically, since the SSD data storage rate of a parity group to which the data is migrated increases, it is determined whether a parity group to which the data is migrated has enough free space and whether, with an increase in data storage rate due to the migration, the remaining life of the parity group does not end before the target operation date (Step S903).

In a case where it is determined as a result of the determination in Step S903 that there is a parity group to which the data is migratable (Step S903: yes), the storage controller 10 performs in-extent-data replacement processing (Step S904) and executes various-tables update processing for changing the correspondence of the extent associated with the virtual extent, for example (Step S905). Then, the storage controller 10 returns to Step S901.

Meanwhile, in a case where it is determined as a result of the determination in Step S903 that there is no parity group to which the data is migratable (Step S903: no), the storage controller 10 cancels the life extension processing on the drive and returns the processing to Step S901.

Meanwhile, in a case where it is determined in Step S901 that there is no drive that requires life extension (Step S901: no), the storage controller 10 ends the series of processes.

Figure 17:
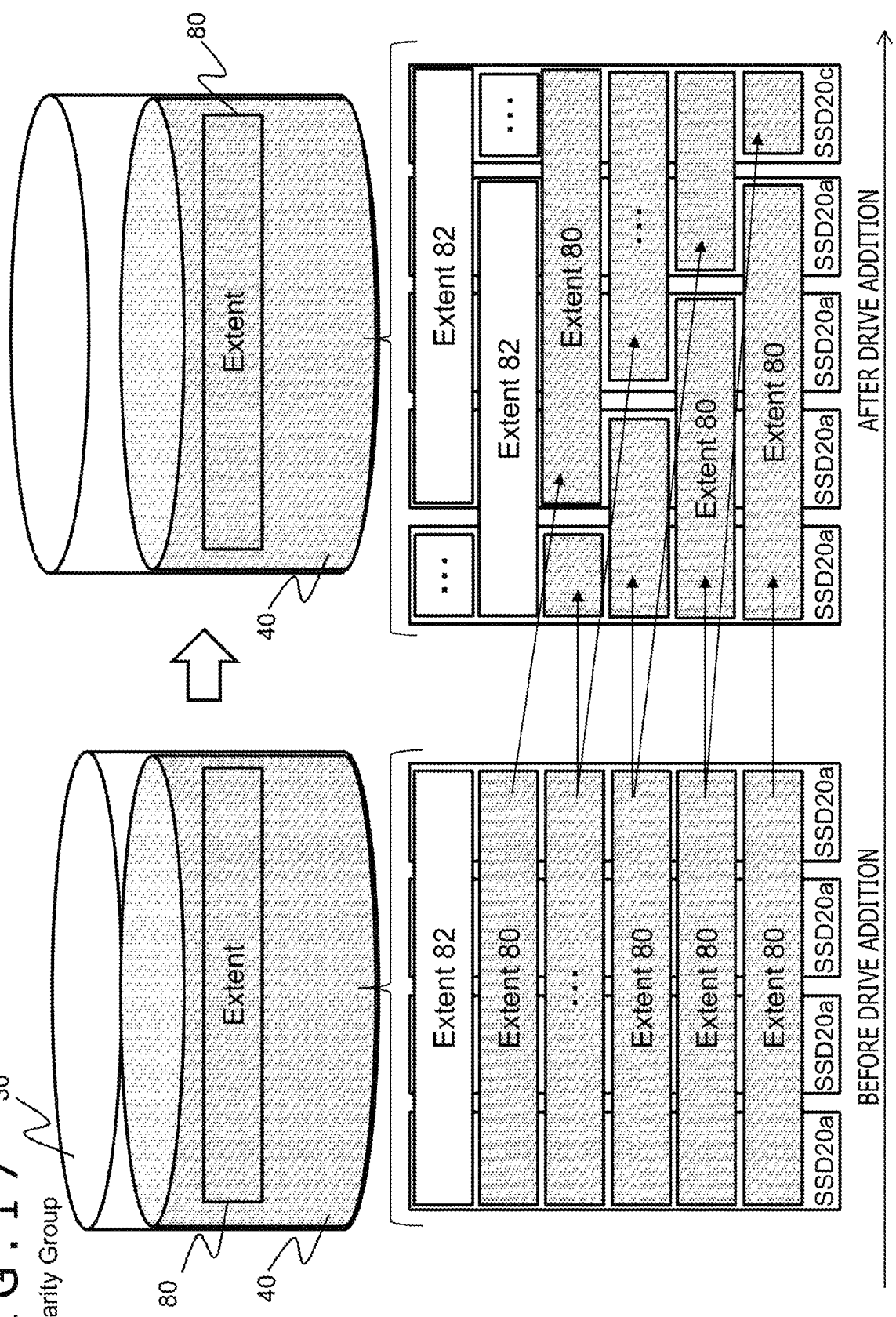
FIG. 17 is a block diagram illustrating an SSD life extension method in a storage apparatus according to a second embodiment.

FIG. 17 is a block diagram illustrating an SSD life extension method in a storage apparatus according to a second embodiment.

In FIG. 17, as SSD life extension means, drive addition is used. The drive addition means a method that adds drives to parity groups by one unit, as described in WO 2017/175285, for example. Note that, after the drive addition, data stored in an existing drive is partly migrated to an added drive by the distributed RAID technology. With this, the data storage rate of an SSD determined not to achieve the target operation period as a result of life expectation decreases, and the life of the SSD can therefore be extended.

Before the drive addition to the parity group 30, data in the extent 80 associated with the virtual volume 60 of FIG. 3 is arranged in the four SSDs 20a in a distributed manner. The parity group 30 also has an extent 82 not associated with the virtual volume 60 of FIG. 3. Further, it is assumed that the storage controller 10 has determined that a life expectation result on the SSDs 20a does not satisfy the target operation period.

Here, the user adds one SSD 20c to the parity group 30. When the SSD 20c is added, the storage controller 10 arranges the data in the extent 80, which has been stored in the four SSDs 20a, to the five SSDs 20a and 20c in a distributed manner. With this, the storage apparatus can hold the data in the extent 80 in the five SSDs 20a and 20c in a distributed manner, thereby to decrease the data storage rate of the existing SSDs 20a.

Note that, in the present embodiment, the storage controller 10 can obtain a capacity to be added. Specifically, the storage controller 10 uses "necessary additional capacity= $P_{(shortage)}$/data storage rate increase rate Sc" as in the method described with FIG. 2. Thus, in the present embodiment, the storage controller 10 may calculate the number of SSDs required for achieving a necessary additional capacity and present the result to the user. For example, when a necessary additional capacity is 300 GB and the existing SSDs 20a are each a 200-GB SSD, necessary additional SSDs may be two 200-GB SSDs or one 300-GB SSD. Alternatively, instead of the addition in units of drives, addition in units of parity groups (addition of a parity group having the same configuration as the existing parity group 30) may be employed.

Figure 18:
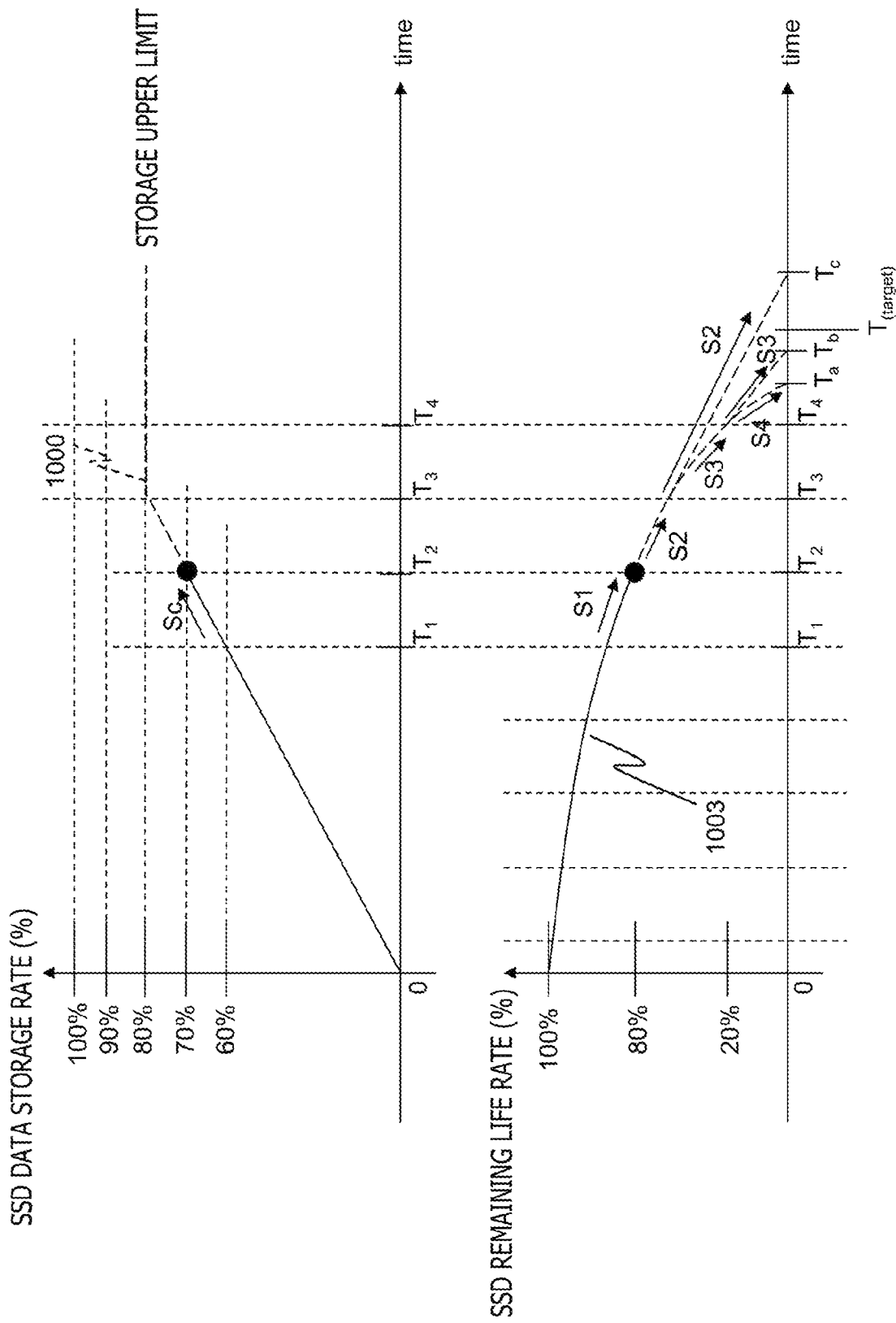
FIG. 18 is a diagram illustrating an SSD remaining life rate extension method with SSD data storage rate limitation in a storage apparatus according to a third embodiment.

FIG. 18 is a diagram illustrating an SSD remaining life rate extension method with SSD data storage rate limitation in a storage apparatus according to a third embodiment. In the third embodiment, the storage controller 10 limits the amount of data stored in the SSD 20 such that the remaining life of the drive does not end before the target operation date.

In FIG. 18, $T_a$ indicates an expected life reached time when the SSD is used until the data storage rate reaches 100%, and $T_a$ is before time $T_{(target)}$ that is the target operation date. Here, the storage controller 10 prevents additional data from being stored in the SSD 20, thereby to extend the life of the SSD 20.

Specifically, the storage controller 10 determines an upper limit value of the data storage rate by the following method. For example, the storage controller 10 calculates an expected life reached time $T_b$ when the data storage rate is limited to 90%. In the calculation of $T_b$, there may be obtained date and time when the life rate reaches zero in a case where the SSD operates at the life consumption rate S3 even after prediction time $T_4$ at which the data storage rate reaches 90%. Further, the storage controller 10 calculates an expected life reached time $T_c$ when the data storage rate is limited to 80%. In the calculation of $T_c$, there may be obtained date and time when the life rate reaches zero in a case where the SSD operates at the life consumption rate S2 even after prediction time $T_3$ at which the data storage rate reaches 80%.

Here, it is assumed that, at $T_b$, the remaining life ends before $T_{(target)}$, but the remaining life lasts over $T_{(target)}$ at $T_c$. Here, the storage controller 10 determines that, when the upper limit of the data storage rate of the SSD 20 is 80%, the remaining life lasts over the target operation period. Further, the storage controller 10 sets, on the basis of the result, the upper limit of the data storage rate of the SSD 20 to 80% and notifies the user of the change through the management host apparatus 3.

Note that, in the embodiments described above, the method in which the controller predicts an SSD remaining life on the basis of an SSD data storage rate, but the controller may predict, on the basis of the data storage rate of a memory area provided by a non-volatile memory, a memory area remaining life. This memory area may be in units of drives such as SSDs, parity groups, FM chips, or FM blocks, or other units. Further, the present invention may be applied to, other than storage apparatuses having SSDs mounted thereon, universal serial bus (USB) memories, secure digital (SD) cards, or flash storages that are used in smartphones, for example. Further, in the embodiments described above, the storage controller 10 does not directly manage the internal control of the FMs, but the present invention is also applicable to, for example, a system called "open channel" in which the storage controller 10 directly manages the internal control of the FMs such as the FM reclamation processing.

Note that, the present invention is not limited to the above-mentioned embodiments and includes various modifications. For example, the above-mentioned embodiments have been described in detail for easy understanding of the present invention; however, the present invention is not necessarily limited to a structure that includes all the components described above. Further, a component of a certain embodiment may be replaced by a component of another embodiment, or a component of a certain embodiment may be added to another embodiment. Further, for a component of each embodiment, addition, omission, or replacement of another component can be made. Further, the above-mentioned components, functions, processing units, processing means, and the like may be, in part or in whole, implemented by hardware, for example, an integrated circuit.

What is claimed is:

1. A storage apparatus comprising:
   a plurality of drives each including a plurality of non-volatile memories; and
   a controller configured to process data that is stored in the drives, wherein
   the non-volatile memories each have a life based on an amount of data writing,
   the controller performs the processing based on a remaining life of each of the non-volatile memories,
   the controller predicts the life of each of the non-volatile memories based on an amount of data writing to the corresponding drive and a data storage rate of the corresponding drive,
   the controller calculates a consumption rate of the life based on the amount of data writing to the corresponding drive and the data storage rate of the corresponding drive,
   the controller has an expected write amplification (WA) value management information in which the data storage rate is associated with an expected WA value, selects an expected WA value based on the data storage rate of the corresponding drive,
   the controller calculates an expected length of stay by determining an amount of time for the data storage rate to increase by a predetermined amount, and
   the controller calculates the life based on the consumption rate of the life, the magnification of estimated WA and the expected length of stay.

2. The storage apparatus according to claim 1,
   wherein the non-volatile memories are each a write-once, read-many device,
   the drives each include a memory controller, and
   the memory controller performs reclamation of migrating, in the corresponding drive, data stored in the non-volatile memories.

3. The storage apparatus according to claim 1, wherein the controller calculates the consumption rate of the life based on the selected expected WA value and the amount of data writing.

4. The storage apparatus according to claim 2,
   wherein the drives each provide a memory area to the controller, and
   the controller manages a capacity of the memory area of each of the drives and the data storage rate of each of the drives.

5. The storage apparatus according to claim 1,
   wherein the drives each provide a memory area to the controller, and the controller manages a capacity of the memory area of each of the drives and the data storage rate of each of the drives, and predicts, based on the capacity of the memory area of each of the drives and the data storage rate of each of the drives, the life of each of the non-volatile memories of the corresponding drive.

6. The storage apparatus according to claim 5, wherein the controller migrates the data between the drives such that a difference between the data storage rates of the drives is reduced.

7. The storage apparatus according to claim 5, wherein the controller migrates the data between the drives based on the life of the non-volatile memory predicted as a life of the corresponding drive and a target operation period set for the drives.

8. The storage apparatus according to claim 5, wherein the controller notifies need of addition of the drives, based on the life of the non-volatile memory predicted as a life of the corresponding drive and a target operation period set for the drives.

9. The storage apparatus according to claim 1,
wherein the plurality of drives form a parity group,
the plurality of drives of the parity group form extents using respective memory areas,
a plurality of pieces of data stored in one of the extents are migrated to another of the extents based on life prediction on any of the drives of the parity group, and
the extent that is the migration destination is the extent without the memory area of the drive associated with life prediction that causes the migration.

10. A data processing method for a storage apparatus, the storage apparatus including
a plurality of drives each including a plurality of non-volatile memories, and
a controller configured to process data that is stored in the drives,
the non-volatile memories each having a life based on an amount of data writing,
the data processing method comprising:
performing the processing based on a remaining life of each of the non-volatile memories;
predicting the life of each of the non-volatile memories based on an amount of data writing to the corresponding drive and a data storage rate of the corresponding drive;
calculating a consumption rate of the life based on the amount of data writing to the corresponding drive and the data storage rate of the corresponding drive;
selecting an expected write amplification (WA) value based on the data storage rate of the corresponding drive from expected WA value management information in which the data storage rate is associated with an expected WA value;
calculating an expected length of stay by determining an amount of time for the data storage rate to increase by a predetermined amount; and
calculating the life based on the consumption rate of the life, the magnification of estimated WA and the expected length of stay.

* * * * *